Oct. 8, 1940.                W. H. STEGER                2,217,389
                        PANEL FASTENING DEVICE
                         Filed Feb. 14, 1938
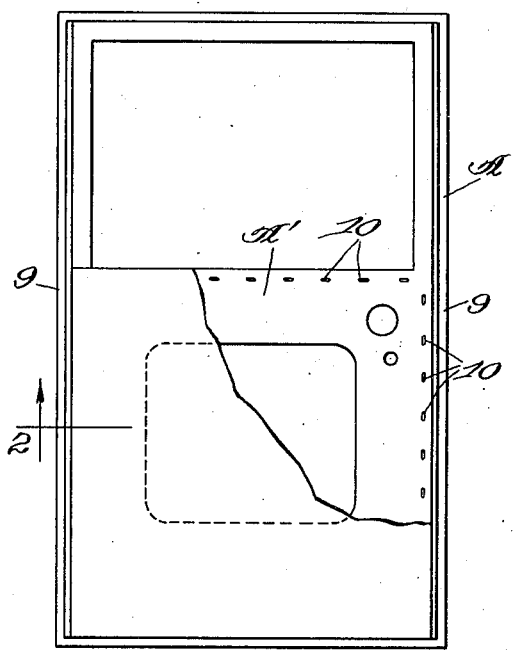
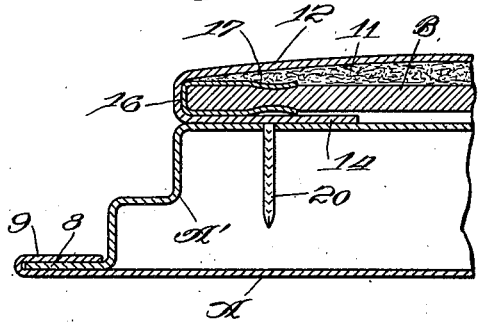
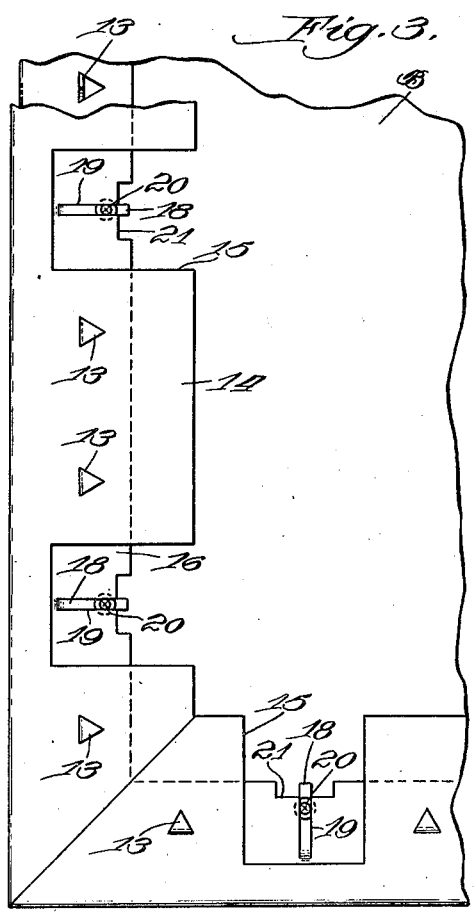
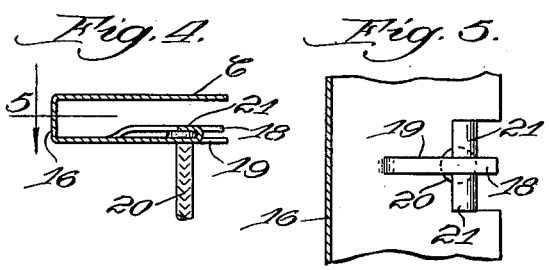
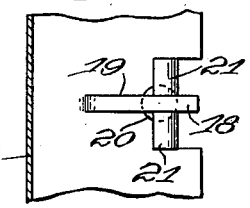
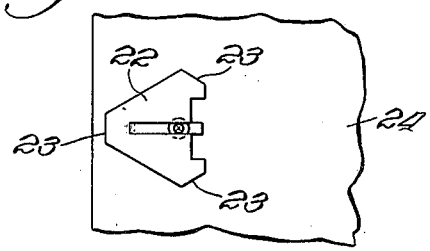
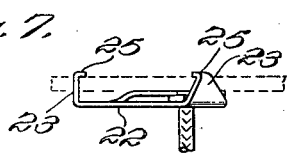

Patented Oct. 8, 1940

2,217,389

UNITED STATES PATENT OFFICE 2,217,389

PANEL FASTENING DEVICE

Werner H. Steger, Chicago, Ill.

Application February 14, 1938, Serial No. 190,530

3 Claims. (Cl. 45—138)

This invention relates to improved means for removably securing panel members or the like to frames such as vehicle bodies, doors, or the like.

The primary object of the invention is to provide improved fastening means on cover panels, such as upholstery panels, which may be readily attached to frame members of either wood or metal. The fastening means is adapted to hold the panel firmly in position but will permit its removal and replacement in the event that it is desirable to make repairs.

A further object of the invention is to provide fastening means which may employ ordinary headed nails which may be removably attached to the panel after the upholstery is applied. Frequently it is desirable to make up the upholstery panels in one plant and ship them to another for installation in automobiles, for example. Under such circumstances it is desirable to have a fastening device which is not permanently secured to the panel and will not require extra space and care in handling during shipment.

Another object of the invention is to provide a fastening on the panel wherein the nail is capable of some lateral shifting, longitudinally of the slot, so that some tolerence is provided to take care of small inaccuracies of registration between the panel and frame member upon which it is mounted. Many of the automobiles now being manufactured have all steel bodies and the panels must be detachably secured to a metal mounting plate. By arranging nail receiving slits in such a mounting plate, at right angles to the slots in which the nails are mounted on the upholstery panel, a certain amount of tolerance is provided in various directions.

Another object of the invention is to use the material cut from the slot in the metal plate on the panel to form a backing member upon which the nail head rests while being driven into the frame member upon which the panel is mounted.

A further object of the invention is to provide inwardly extending projections adjacent to the open end of the nail-receiving slot so that the lateral movement of the nail head in the slot is limited and there is no danger of it falling out.

Other advantages of the present invention will be apparent from the following detailed description.

The invention is illustrated in preferred embodiments in the accompanying drawing, in which:

Figure 1 is an elevational view of a door frame member provided with a panel partly broken away; Fig. 2, an enlarged fragmentary sectional view, taken as indicated at line 2 of Fig. 1; Fig. 3, a broken elevational view showing the inner side of an upholstery panel; Fig. 4, a sectional view of the fastening device with a nail mounted therein; Fig. 5, a fragmentary view, taken as indicated at line 5 of Fig. 4; Fig. 6, a fragmentary plan view showing a slightly modified construction in which a single fastening device is used and is secured to a panel by integrally formed projections which may be driven through the panel and clinched thereto; and Fig. 7, a broken elevational view of the device shown in Fig. 6.

In the embodiment illustrated in Fig. 1-5, A designates a frame member provided with a fixed metal mounting plate A'; B, a fibrous panel which may be upholstered as desired; and C, a fastening device for securing the panel B to the metal mounting plate A'.

The frame A may be of any suitable construction or material and is shown in the form of a heavy sheet metal door. The metal mounting plate A' may be secured to the frame member in any desired manner but is shown with its marginal edge portions embraced and clinched by an extension 9. The mounting plate is provided with a longitudinal series of long narrow slits 10 spaced away from the frame member to provide room for the shanks of the nails.

The panel B may be of heavy cardboard and after the fastening device C has been attached, the outer face of the panel may be covered with suitable cotton wadding 11 and upholstery fabric 12 which is shown turned down under the panel and secured to the inner face thereof. If desired, the fastening device may be provided with inwardly extending metal projections 13 which pierce the upholstery fabric and hold it in position. Preferably, the inner marginal edge portions of the upholstery fabric are pasted to the panel, as indicated at 14, and cut-outs 15 are provided to permit the nails to be inserted in the slots.

The fastening device C, in the preferred embodiment, is shown in the form of a U-shaped strip 16 which encloses the marginal edge portions of the panel and may be crimped thereto, as indicated at 17. The strips may be made of thin resilient sheet metal and at regularly spaced intervals flat fingers 18 are struck inwardly to form narrow slots 19 of sufficient width to snugly receive the shanks of nails 20. Preferably, marginal edge portions of the plate, adjacent to the open end of the slot, are bent inwardly and backwardly to form a keeper 21 which serves to retain the head of the nail 20 in the slot.

The fastening strip lies snugly against the inner face of the panel B and after the panel has been upholstered, the strip is sufficiently resilient to permit the head of the nail 20 to be forced into the slot between the inner face of the panel B and the keeper 21. If desired, the nail may be removed in the same way by tilting the head up on one edge but this is somewhat more difficult and is only necessary in the event that a defective or broken nail is found. After the nails have been inserted in the slots, the panel may be secured to the mounting plate A' by driving the nails 20 through the slits 10, as will be readily understood. This action forces the metal of the mounting plate inwardly and its sharp edges cut into the shank of the nail, which may be serrated, if desired, and forms an extremely tight connection. If it becomes necessary to remove the panel, it may be pried away from the mounting plate with a screw driver, or the like.

In the embodiment shown in Figs. 6 and 7, the construction of the fastening device is the same as that described above wherein the nails may be detachably secured in the slots. However, instead of having a U-shaped supporting plate, it may be made up in the form of a triangle 22 whose corner portions 23 are turned inwardly so as to pierce the fibrous panel 24 and permit their sharpened edge portions 25 to be clinched in position. Fastening devices of this character may be located as desired anywhere on the face of the panel.

The foregoing detailed description has been given for clearness of understanding only, and no unnecessary limitations should be understood therefrom, for modifications will be obvious to those skilled in the art.

I claim:

1. A fastening device for panel boards or the like, comprising: a thin metal plate adapted to be permanently secured to a panel board, a finger struck inwardly from said plate to form a narrow slot extending from one margin of the plate to the junction between the finger and plate; and a nail having its shank extending through said slot and its head interposed between said finger and the outer marginal edge portions of the plate at the slot.

2. A device as specified in claim 1, in which the plate is equipped near the open end of the slot with inwardly extending projections adapted to limit lateral movement of the nail head longitudinally of the slot.

3. A fastening device for panel boards or the like, comprising: a thin metal plate adapted to be permanently secured to a panel board, a finger struck from said plate and offset inwardly to form a narrow slot extending from one margin of the plate to the junction between the finger and plate, the marginal portions of said plate adjacent to the open end of the slot being bent inwardly and backwardly to form a keeper for a nail head; and a nail detachably secured to said plate by having its head interposed between said finger and plate and its shank extending through said slot.

WERNER H. STEGER.